UNITED STATES PATENT OFFICE 2,330,986

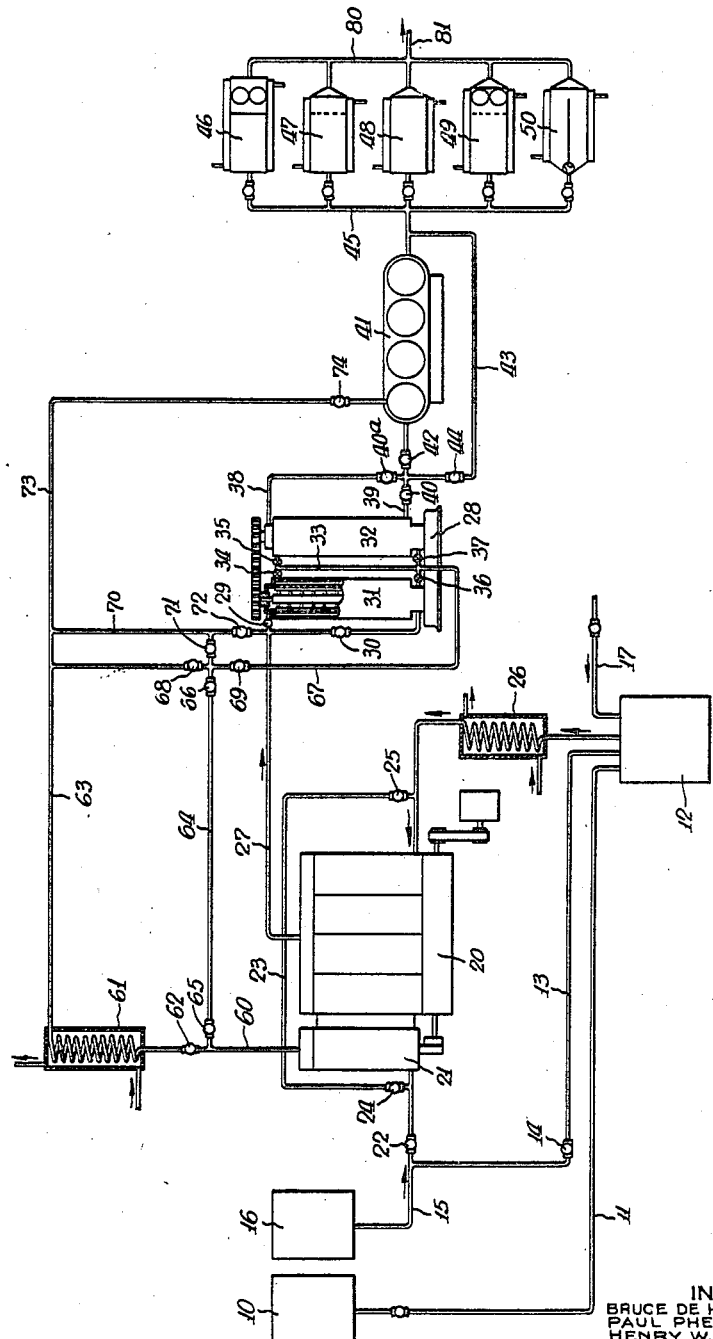

PREPARATION OF EMULSIONS

Bruce De Haven Miller, Paul Phelps, and Henry W. Bevarly, Louisville, Ky., assignors to The Girdler Corporation, Louisville, Ky., a corporation of Delaware Application March 18, 1939, Serial No. 262,644

12 Claims. (Cl. 99—122)

This invention relates to the manufacture of emulsified products such as margarine and other materials wherein the balancing of characteristics inherent in the materials used and developed in the emulsion during processing, must be secured in order to produce a satisfactory final product.

To those skilled in the art it is known that many variable factors are to be found in the commercial manufacture of margarine and that in order to produce a uniform product of desired characteristics, the process of manufacture must be able to control those factors at all times.

Usually when the margarine product is made from vegetable oils, such as cottonseed or soya bean and which have been hydrogenated to the point where they are solid or semi-solid at room temperature and have about a 100° F. melting point and such oils in liquid or melted form are emulsified with moisture prior to chilling to form-retaining consistency, it is comparatively simple for the manufacturer to secure a solid print of material which is firm and dense and which has a tight emulsion. However, in such a case the flavor and aroma of the margarine is not entirely satisfactory and difficulty is had in uniformly disseminating coloring matter throughout the product if that additional processing step is desired.

When the product is made from a mixture of oils having a comparatively high percentage of coconut oil, the secondary oil used is usually one which has been hydrogenated to about a 140° F. melting point and the emulsion of the melted oils with moisture is made prior to chilling. In processing this type of material the manufacturer has had difficulty in preventing fat particles from crystallizing out and may frequently produce a product which is dense and which has little flavor or aroma.

A serious problem of manufacture also exists in cases where it is necessary to work the solid-idified material of a tight emulsion in order to bring out flavor and aroma, for in these cases the product may then become too soft to be packaged, or may "weep" by losing water from the emulsion or may result in non-uniformity of weights when the product is packaged.

Since the nature of the oils and the proportions of the same used in the manufacture of margarine may vary widely due to fluctuations in the price of different oils, it is most important that a commercially satisfactory process of manufacture be such that ready adjustment may be made in order to handle many differing conditions and at the same time enable the manufacturer to produce a final product having balanced characteristics of appearance, flavor, aroma and the like. It will be understood that the term "oil" is used herein in the broader sense as including fats.

As another illustration, the process must be adapted to provide for reprocessing of variable amounts of remelted material which for one reason or another are not to be sold as a final product. Furthermore, in those types of processes which are carried out under such conditions that the materials are exposed to the atmosphere, as for example, by the use of the well known chill roll process and in the wet process, variable amounts of moisture due to humidity conditions in the atmosphere and to non-uniform water drainage from the wet process will have an influence upon the final product. Therefore, it is desirable to employ a closed process in which these conditions will not be present in order that the advantages above referred to can be secured.

In the closed processes of manufacture now known, it is customary to mix the complete emulsion of oil, moisture, salt, and the like prior to the chilling operation, and as a result the chilling, working and solidifying phases of manufacture must be subordinated to the characteristics inherent in the particular emulsion thus prepared. As a consequence, it is frequently found that margarine apparatus capable of producing a desirable product of balanced aroma, flavor and texture with one type of oil or one ratio of ingredients will be entirely incapable of producing a desirable product when the emulsion is changed. This disadvantage is believed to be due to the inflexibility of processing control which is inherent in a process wherein the entire emulsion is prepared before the chilling and solidifying phases of manufacture.

The present invention provides a solution of the problem and whereby the above mentioned and many other disadvantages inherent in the prior art are overcome and provides a continuous process of manufacturing margarine capable of immediate and accurate control to insure a final product having a balanced flavor, aroma and texture.

An important object is the provision of a continuous process for manufacturing emulsions and permitting a control of the proportions of the ingredients before, during or after the chilling of an oil ingredient.

Another object is the provision of a process for mixing and moving margarine emulsions in liquid state through a continuous process conducted under superatmospheric pressure.

Another object is the provision of a process whereby liquid ingredients may be mixed with a supercooled margarine emulsion.

Other objects and advantages of the invention will become more apparent when considered in connection with the accompanying diagrammatic drawing which indicates one arrangement of apparatus suitable for carrying out the invention.

The apparatus shown includes a vessel 10 for the supply of melted oil connected by pipe 11 with any suitable mixing tank 12. A milk or moisture supply tank 16 is connected to this mixing tank by pipes 13 and 15, the former being controlled by a valve 14. Also leading into tank 12 is a pipe 17 through which remelt material or the like may be added for later processing in the system. As will be apparent other ingredients for the margarine such as salt, flavoring material and the like may be added in either tank 10, 16 or 12.

Preferably these tanks will form the only points of entrance of materials into the closed processing system now to be described. As a result no additional moisture can enter the system, as happens when the open roll or wet processes of manufacturing margarine is used. Moreover, dust, bacteria and other impurities are also excluded since the materials from tanks 10, 12 and 16 are the sole ingredients incorporated in the plastic material which passes from outlet 81 of the system.

In view of the fact that a certain amount of remelt material having a moisture content is often reprocessed and since the flexibility of control accomplished by this invention can still be secured when a portion of the moisture content is emulsified with the incoming oil, it is preferred to maintain a constant percentage of oil and moisture in the form of an emulsion in tank 12. Consequently, sufficient moisture from tank 16 passes at all times into tank 12 to maintain a definite ratio of oil and moisture therein and to insure that a mixture of definite proportions will be processed. Merely, as an example, it is found that when approximately 30% of all the moisture being used enters the process in this manner a satisfactory product may be secured upon any type or proportion of oils. Obviously when an easily processed oil is to be used all of the moisture could be mixed with the oil in tank 12 and the emulsion formed in the conventional manner such as shown in U. S. Patent No. 2,013,025.

The pressure source is shown as a proportioning pump structure 20 which serves to impose a superatmospheric pressure upon the liquid materials entering the closed processing system. In order to provide for the processing of oils in which the moisture ingredient requires especial consideration as later described, the pump 20 may be provided with an adjustable pumping cylinder 21 through which the necessary portion of the moisture ingredient may enter the closed pressure system directly from pipe 15, the amount being controlled by a valve 22. In those cases in which the characteristics of the final product permit the entire mixture to be formed prior to the chilling action, material from the tank 16 may be delivered to the pump cylinder 21 through by-pass 23 under control of valves 24 or 25 so that the oil and moisture can be mixed in the desired proportions prior to entering the pressure source. It has been found that under certain conditions, as for example, with coconut oils requiring a high emulsion temperature to avoid graining of hard fat, a control of the temperature as well as the proportions of the mixed ingredients is desirable. Therefore, in some cases it is desirable to employ a heat exchange means 26 through which any suitable heating or cooling medium can be passed in order to adjust the temperature of the material entering pump 20 from tank 12.

A simple emulsion of oil and moisture after being put under pressure by pump 20 is directed through pipe 27 whence it may pass into the metal cylinder 31 of any desired processing apparatus 28 and may enter either through an inlet at one end of the apparatus under control of valve 29 or through an inlet at the other end of the apparatus under control of valve 30. The apparatus 28 is preferably of the general type disclosed in U. S. Letters Patent No. 2,013,025 wherein a rapid extraction of heat from the material under treatment will be obtained with concurrent agitation of material with the result that the material is supercooled while remaining in liquid form. Obviously, other forms of apparatus in which this result can be secured may be employed without departing from this invention. We have found that two vertical processing cylinders 31 and 32 arranged for flow of material therethrough in series may be employed with desirable results. By means of pipe 33 and valves 34, 35, 36 and 37, the material in liquid form may be passed through the cylinders in series and in either direction and emerge therefrom into either pipe 38 or 39 as desired.

Since the processing cylinders 31 and 32 may be provided with any desired type of refrigerating apparatus, controls and chilling medium it may be advantageous at different times to have the margarine emulsion pass therethrough along varying paths depending upon a given set of conditions and by thus providing alternate paths an additional control is made available to the operator.

In passing through the chilling step under pressure and subject to the violent agitation and chilling, the emulsion is rapidly cooled to a temperature substantially below the temperature at which it sets or solidifies and yet remains in liquid form. As a result additional moisture or other liquid can be readily added thereto and mixed therewith at such points along its path of travel as will insure a proper blending therewith and a balancing of characteristics inherent in the materials being used.

When the processed material in the form of a supercooled liquid leaves cylinder 32 by pipe 38 or 39 under control of valves 40a or 40, it may be passed through a mechanical blending apparatus indicated generally at 41, the admission being under control of valve 42, or it may be by-passed around the blender through pipe 43 controlled by valve 44, or may be divided with part thereof going through blender 41 and part around said blender.

The supercooled processed material under pressure thereupon enters header 45 from which it may be passed through any one or all of appropriate units 46, 47, 48, 49 or 50 controlled by entrance valves and from which unit or units the margarine emulsion will be discharged in condition for packaging or other treatment.

The supercooled liquid emulsion entering header 45 will set or solidify either partly or completely as soon as it reaches a substantially quiescent state since the previous violent agitation is largely instrumental in maintaining it in liquid condition even though supercooled. If such an emulsion is composed of oils, which tend to solidify into a comparatively hard condition it may be directed through the apparatus 46 having a volume sufficient to allow the liquid to reach a substantially quiescent state and after setting up therein be moved by the pressure existing in the system, thence between rolls which will break up the solidified form of the material and permit the material to move into the outlet header 80 and thence into the outlet 81.

If the material does not set up into such a hard condition requiring the use of positive mechanical force of such rolls it may move through unit 47 and be forced through a screen member which will give it a comparatively mild working and thence move into outlet 81.

If the material is such that it will set up into the desired condition without any working it may move through unit 48 which obviously could be a mere storage or tempering chamber or an elongated enlarged piping system, and thence into outlet 81.

In case the material requires substantial working it may pass through unit 49 and receive a mild working as by a screen together with a heavy working as by rolls and thence into outlet 81.

If the material requires no positive working it may pass through a unit such as 50 wherein a valve directs it to a plurality of spaces alternately.

While going into one chamber or space the material in the other is quiescent and sets. The valve is then shifted to permit setting in the first and the forcing out of the set material from the other. Thus, the material is alternately set and forced from each space to the outlet 81.

As will be noted the entire closed system is maintained under superatmospheric pressure from pump 20, 21 until the material is extruded through outlet 81. Although pump 20, 21 is shown as the single source of pressure and as the highest source of pressure the invention could also be carried out by the employment of booster pumps and the like if desired at proper places along the line.

Material leaving outlet 81 may be subjected to any desired treatment, but customarily will require only a subdividing and packaging treatment.

When the heat of crystallization developed in the supercooled materials requires a heat transfer action in any of units 46, 47, 48, 49 or 50 it is contemplated that any suitable means may be employed to remove this heat and to facilitate the solidifying and tempering action of the material. For instance, each may have a jacket for the circulation of a tempering medium.

This material in which the aroma, flavor and texture have been developed and balanced by virtue of the previous processing will then form the article of commercial margarine.

In following the above processing steps which are applicable to certain easily processed types of oils, it will be noted that no particular treatment was required for the moisture ingredient of the margarine. However, in the use of various oils more difficult to process, it is desirable to introduce the major action of the milk or other moisture into the oil during or after such oil has received a partial cooling action. Pump cylinder 21, therefore, is adapted to deliver the requisite quantity of moisture under pressure into pipe 60 whence the material may flow through heat exchanger 61 under control of valve 62 and thence into pipe 63. Heat exchanger 61 customarily serves as a precooler for the material under pressure.

When the milk or the like does not require a temperature change it may be by-passed through pipe 64 under control of valves 65 and 66 and enter pipe 67 which joins pipe 63 under control of valves 68 and 69 with the pipe 33 intermediate the processing cylinders. Likewise pipe 64 may join pipe 70 connecting pipe 63 with the inlets to the initial processing cylinder 31 and controlled by valves 71, 72, and 30.

In those situations in which the oil being used tends to "set-up" into a hard body requiring the action of agitating and mixing blender 41 it may be desirable to introduce the precooled moisture from pipe 63 directly into the supercooled oil ingredient in that blender without passing through the processing unit 28, and in this case the pipe 73 leads the cooled milk into the inlet of blender 41 under control of valve 74.

From the foregoing it will be seen that a method of manufacturing margarine is provided whereby the proportions and temperatures of the ingredients can be controlled accurately at all points of the manufacturing process. This control may be exerted before the materials are supercooled, while they are subject to supercooling and after they have been supercooled or at one or more of these phases simultaneously. This desirable feature enables the operator to adjust his process of manufacture to meet the limitations of the apparatus which he uses, to meet the variations in the conditions of manufacture which may be present from day to day or even from hour to hour and also to utilize various types of oil for the manufacture of margarine which heretofore could not be utilized satisfactorily.

As an illustration of the adaptability of the invention a few examples of actual manufacture are given.

Whereas by known methods of manufacture the final product from a 100% cottonseed oil hydrogenated to the desired extent tends to have a tight emulsion with trouble from poor aroma and flavor or, if it is worked to bring out that flavor and aroma, it is often too soft for packaging, the present invention may be utilized as follows to correct this trouble. Pump 20 can pump all of the cottonseed oil, emulsified with a part of the milk, through pipe 27 and through the first processing cylinder 31 while the major part of the milk is being pumped by cylinder 21 through the precooler 61 and thence through pipe 67 to mix with the partially cooled cottonseed oil prior to entering the second cylinder 32. After the mixture passes through the second cylinder and from pipe 43 through one of the desired setting up units 46, 47, 48, 49 or 50, the product will have a desirable balanced flavor and aroma, the emulsion will not be so tight and the product will not be too soft to package when extruded from outlet 81. Any one or more of units 46 to 50 may be omitted or units may be provided which will accomplish the functions of several of those illustrated.

Whereas by known methods of manufacture the final product from an oil emulsion having 75% or more of coconut oil requires an emulsion temperature of about 120° F. to prevent the hard fat from graining out, and makes a dense product of low aroma and flavor and becomes too soft to package when worked to improve those disadvantages, the present invention may be used as follows to correct this trouble.

If the coconut oil ingredient is about 95% of the total oil used, the major part of the precooled milk from cylinder 21 may be added at the entrance to cylinder 32 and the mixed supercooled material then run through the blender 41 and thence through an appropriate final unit. If the coconut oil percentage is about 75%, the same procedure may be followed but the action of blender 41 may be omitted. In each of these instances the balancing of the desirable characteristics in the final product will be secured.

By utilizing this invention many advantages not readily apparent will be found in actual practice thereof. Since the moisture material, which usually will be milk, has a specific heat greater than that of the oil used in margarine, it will be found that the mixing of the major portion of the chilled moisture with the oil after such oil has been partially cooled will result in lowering the heating of the material due to heat of crystallization of the emulsion after it passes from its supercooled state.

By mixing moisture such as milk with oil which has received previous processing, the characteristic flavor and aroma of the milk will be more evident in the emulsified mixture than when the entire mixture is passed concurrently through the entire system.

Having thus described our invention, what we claim as new and desire to secure by Letters Patent is:

1. The process of preparing a solidified emulsion product, which includes providing oil of such consistency that it will be capable of forming such solidified product, melting said oil to liquid state, emulsifying the melted oil with moisture in a manner to provide an emulsion having less moisture content than that desired in the final product, supercooling said emulsion to a temperature substantially below the setting temperature of the emulsion while maintaining the emulsion in liquid state, adding moisture to said supercooled emulsion, agitating the mixture to disperse the added moisture throughout the supercooled emulsion, and thereafter permitting the supercooled liquid emulsified mixture to solidify.

2. The process as defined in claim 1 in which the added moisture material is cooled before being added.

3. The process as defined in claim 1 in which the emulsion and moisture are continuously delivered for treatment and the product is continuously extruded.

4. The process as defined in claim 1 in which the oil and moisture emulsion are continuously agitated while being supercooled.

5. The process as defined in claim 1 in which the supercooling and agitating are conducted under superatmospheric pressure.

6. The process of preparing a solidified emulsion product containing oil and moisture which includes continuously delivering the oil in melted condition and of such consistency that it will be capable of forming such solidified product and a portion of the moisture through a closed system and mixing the same, simultaneously supercooling and agitating said mixture under superatmospheric pressure, adding moisture to the supercooled mixture, further chilling and agitating the supercooled mixture with the added moisture and then permitting the emulsified mixture to congeal to a substantially solid state.

7. The process as defined in claim 6 in which the relative amounts of the moisture in the oil and that added are in accordance with the character of the oil being treated.

8. The process of preparing a solidified emulsion product containing oil and moisture which includes continuously delivering the oil in melted condition and of such consistency that it will be capable of forming such solidified product and a portion of the moisture through a closed system and mixing the same, simultaneously supercooling and agitating said mixture under superatmospheric pressure, cooling additional moisture and blending the additional moisture with the supercooled material, and then permitting the blended material to congeal into a substantially solid state.

9. The process of preparing margarine, which comprises forming an oil and moisture emulsion having substantially less moisture content than that desired in the final product, supercooling said emulsion to a temperature substantially below the setting point thereof while maintaining the emulsion in liquid state, adding moisture to the supercooled emulsion to make up the deficiency in moisture content, agitating the mixture of supercooled emulsion and added moisture, and thereafter permitting the supercooled emulsified mixture to solidify.

10. The process of preparing margarine, which comprises forming an oil and moisture emulsion having substantially less moisture content than that desired in the final product, subjecting said emulsion to concurrent chilling and agitation in a manner to supercool the emulsion to a temperature below the setting point thereof while maintaining the emulsion in a liquid state, blending additional moisture with the supercooled emulsion and thereafter permitting the emulsion to solidify.

11. The process of preparing margarine, which comprises forming an oil and moisture emulsion having substantially less moisture than that desired in the final product, subjecting said emulsion to concurrent supercooling and agitation, adding moisture to the supercooled emulsion, subjecting the mixture of supercooled emulsion and added moisture to further chilling and agitation, and thereafter permitting said mixture to solidify.

12. The process of preparing margarine, which comprises continuously delivering oil and moisture in substantially constant relative proportions to a closed system, continuously forming an emulsion of the oil with only a part of the concurrently delivered moisture in said closed system, continuously subjecting said emulsion to concurrent supercooling and agitation in a part of said system while maintaining the emulsion under superatmospheric pressure, continuously conducting the remainder of said moisture through another part of said system and adding such remainder to the supercooled emulsion, continuously subjecting the mixture of supercooled emulsion, and added moisture to further agitation, and thereafter permitting said mixture to solidify.

BRUCE DE HAVEN MILLER.
PAUL PHELPS
HENRY W. BEVARLY.